US012563217B2

(12) United States Patent
Chen et al.

(10) Patent No.: US 12,563,217 B2
(45) Date of Patent: Feb. 24, 2026

(54) SYSTEMS AND METHODS FOR CANDIDATE LIST CONSTRUCTION

(71) Applicant: Tencent America LLC, Palo Alto, CA (US)

(72) Inventors: Lien-Fei Chen, Palo Alto, CA (US);
Roman Chernyak, Palo Alto, CA (US);
Xiaozhong Xu, Palo Alto, CA (US);
Xin Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 63 days.

(21) Appl. No.: 18/619,028

(22) Filed: Mar. 27, 2024

(65) Prior Publication Data

US 2024/0348811 A1      Oct. 17, 2024

Related U.S. Application Data

(60) Provisional application No. 63/459,566, filed on Apr. 14, 2023.

(51) Int. Cl.
| | |
|---|---|
| *H04N 19/44* | (2014.01) |
| *H04N 19/105* | (2014.01) |
| *H04N 19/137* | (2014.01) |
| *H04N 19/176* | (2014.01) |

(52) U.S. Cl.
CPC ........... *H04N 19/44* (2014.11); *H04N 19/105* (2014.11); *H04N 19/137* (2014.11); *H04N 19/176* (2014.11)

(58) Field of Classification Search
CPC ............................. H04N 19/44; H04N 19/105
See application file for complete search history.

(56) References Cited

U.S. PATENT DOCUMENTS

| | | | | |
|---|---|---|---|---|
| 2016/0219278 A1* | 7/2016 | Chen | ....................... | H04N 19/52 |
| 2019/0174136 A1* | 6/2019 | Jun | ....................... | H04N 19/463 |
| 2021/0185338 A1* | 6/2021 | Xiu | ....................... | H04N 19/174 |
| 2022/0078441 A1* | 3/2022 | Chen | .................... | H04N 19/176 |
| 2024/0323353 A1* | 9/2024 | Zhang | .................... | H04N 19/52 |

OTHER PUBLICATIONS

Tencent America LLC, ISR/WO, PCT/US2024/023621, Sep. 6, 2024, 14 pgs.

* cited by examiner

*Primary Examiner* — Irfan Habib
(74) *Attorney, Agent, or Firm* — Morgan, Lewis & Bockius LLP

(57) ABSTRACT

An example method of video decoding includes receiving video data that includes a current block from a video bitstream. The method also includes generating a subblock-based motion vector prediction (SbTMVP) for a subblock of the current block and generating a SbTMVP-MMVD candidate by applying a merge motion vector difference (MMVD) to the SbTMVP. In accordance with a determination that a motion vector (MV) of the SbTMVP-MMVD candidate meets one or more criteria, the SbTMVP-MMVD candidate is inserted into a candidate list for the current block. In accordance with a determination that the MV of the SbTMVP-MMVD candidate does not meet the one or more criteria, the SbTMVP-MMVD candidate is not inserted into the candidate list for the current block. The method further includes reconstructing the current block using the candidate list.

19 Claims, 7 Drawing Sheets

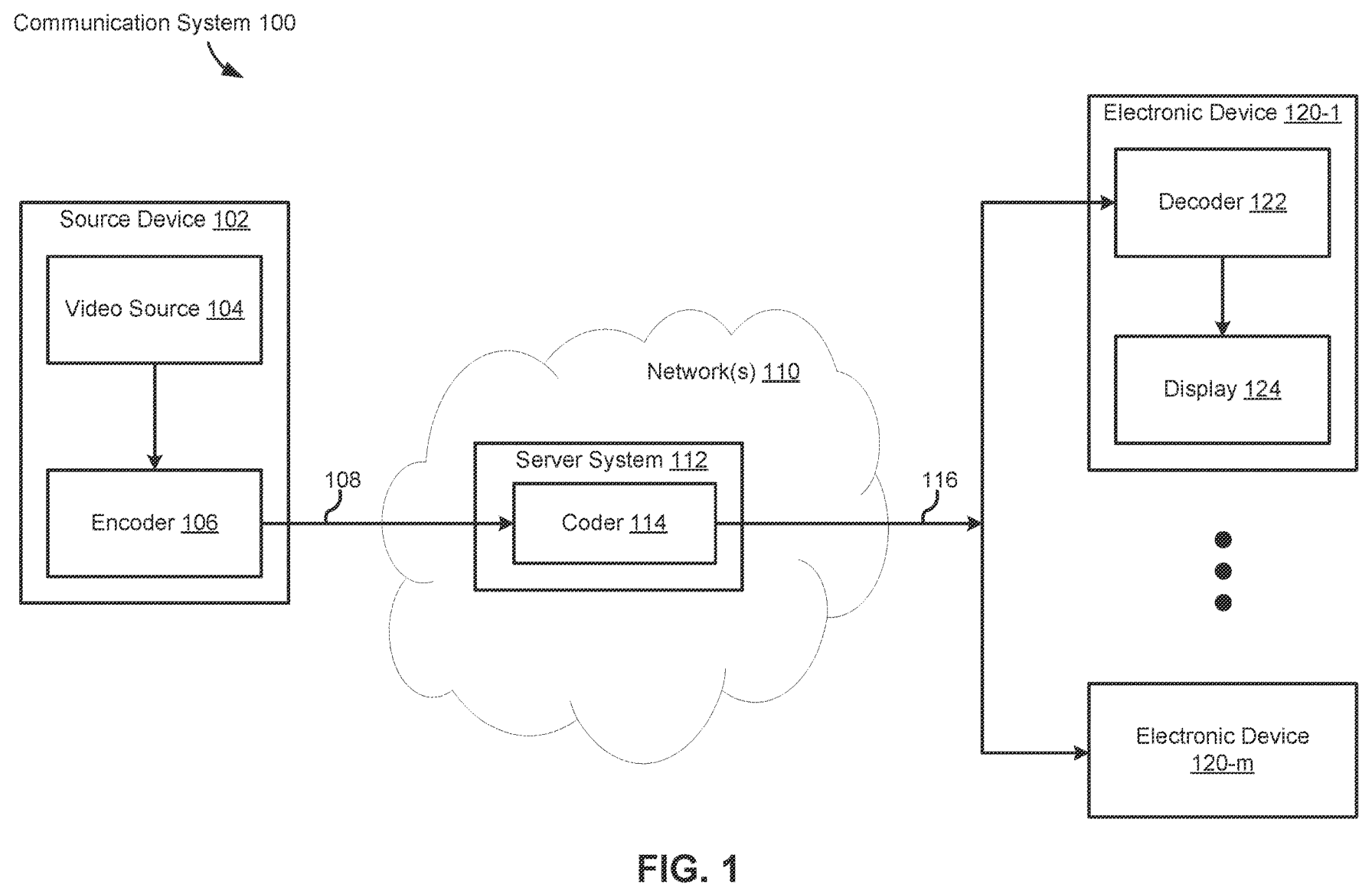

Communication System 100

Source Device 102

Video Source 104

Encoder 106

108

Network(s) 110

Server System 112

Coder 114

116

Electronic Device 120-1

Decoder 122

Display 124

Electronic Device 120-m

FIG. 1

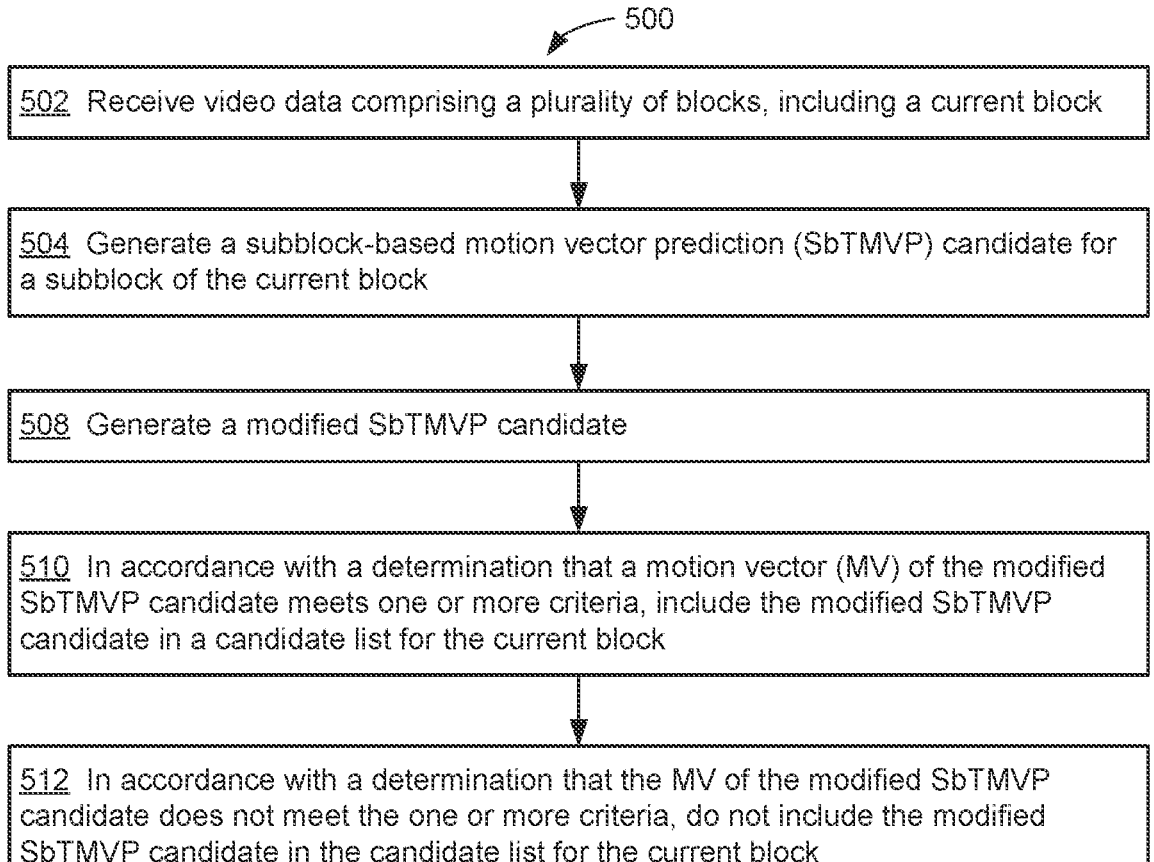

502  Receive video data comprising a plurality of blocks, including a current block 504  Generate a subblock-based motion vector prediction (SbTMVP) candidate for a subblock of the current block 508  Generate a modified SbTMVP candidate 510  In accordance with a determination that a motion vector (MV) of the modified SbTMVP candidate meets one or more criteria, include the modified SbTMVP candidate in a candidate list for the current block 512  In accordance with a determination that the MV of the modified SbTMVP candidate does not meet the one or more criteria, do not include the modified SbTMVP candidate in the candidate list for the current block

FIG. 5A

SYSTEMS AND METHODS FOR CANDIDATE LIST CONSTRUCTION

RELATED APPLICATIONS

This application claims priority to U.S. Provisional Patent Application No. 63/459,566, entitled "Improvement of Candidate List Construction of Subblock Based Motion Vector Predictor With MMVD," filed Apr. 14, 2023, which is hereby incorporated by reference in its entirety.

TECHNICAL FIELD

The disclosed embodiments relate generally to image and video coding and compression, including but not limited to systems and methods for constructing candidate lists for motion vector predictions.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

Blocks of video data (e.g., coding units) may be processed in a predictive-transform coding scheme, where the prediction comes from either intra frame reference pixels, inter frame motion compensation, or some combinations of the two. For each inter-predicted coding unit, motion parameters (such as motion vectors, reference picture indices, and reference picture list usage indices) and additional information may be used for inter-predicted sample generation. Each motion parameter can be signaled in an explicit or implicit manner. As an example, when a coding unit is coded with skip mode, the coding is associated with one prediction unit and has no significant residual coefficients, no coded motion vector delta or reference picture index. A merge mode may be specified whereby the motion parameters for the current coding unit are obtained from neighboring coding units, including spatial and temporal candidates. Note, the merge mode may be applied to any inter-predicted coding unit, not only for skip mode. An alternative to merge mode is to explicitly transmit the motion parameters, where a motion vector, a corresponding reference picture index for each reference picture list, a reference picture list usage flag, and/or other needed information is signaled explicitly for each coding unit.

The present disclosure describes applying a merge motion vector difference (MMVD) on a subblock-based temporal motion vector prediction (SbTMVP) candidate in a subblock MMVD merge list. The syntax element, MMVD index, may be signaled to indicate the MMVD offset for the SbTMVP merge candidate, and this MMVD offset may be used to derive the offset value of the displacement vector (DV) for each SbTMVP-MMVD candidate. The final DV for each SbTMVP-MMVD candidate may be calculated from the DV of the SbTMVP merge candidate with the selected offset. By using a different DV offset, different subblock-based motion field can be obtained to form a SbTMVP-MMVD candidate list.

However, an SbTMVP-MMVD candidate with duplicated MV fields may be put into the candidate list if there is no redundant MV checking mechanism during candidate list construction. Thus, in some embodiments, a checking mechanism is used to detect duplicated MV or lack of MV diversity of the SbTMVP-MMVD during the candidate list construction. Removing redundancy improves coding efficiency as excluding the redundant candidate allows for another candidate to be added to the list. This improves list diversity and gives better candidates for coding, which improves the video coding. Also, a lack of adjustment to handle the MMVD candidate position with a boundary condition of MV field buffer at the collocated position in the collocated picture. Thus, in some embodiments, an adjustment is performed to the derivation of the displacement vector (DV) for the SbTMVP merge candidate for SbTMVP-MMVD candidate list construction. Adjusting the MMVD candidate to be within the boundary condition improves coding efficiency and/or hardware efficiency. For example, if the boundary condition is enforced in software then hardware does not need to be designed to enforce out of boundary values (e.g., allows for smaller buffer size).

In accordance with some embodiments, a method of video encoding is provided. The method includes (i) receiving video data comprising a plurality of blocks, including a current block (e.g., from the video source 104); (ii) generating a subblock-based motion vector prediction (SbTMVP) for a subblock of the current block; (iii) generating a SbTMVP-MMVD candidate by applying a merge motion vector difference (MMVD) to the SbTMVP; (iv) in accordance with a determination that a motion vector (MV) of the SbTMVP-MMVD candidate meets one or more criteria, inserting the SbTMVP-MMVD candidate into a candidate list for the current block; (v) in accordance with a determination that the MV of the SbTMVP-MMVD candidate does not meet the one or more criteria, forgoing inserting the SbTMVP-MMVD candidate into the candidate list for the current block; and (vi) encoding the current block using the candidate list.

In accordance with some embodiments, a method of video decoding is provided. The method includes (i) receiving video data comprising a plurality of blocks, including a current block, from a video bitstream; (ii) generating a subblock-based motion vector prediction (SbTMVP) for a subblock of the current block; (iii) generating a SbTMVP-MMVD candidate by applying a merge motion vector difference (MMVD) to the SbTMVP; (iv) in accordance with a determination that a motion vector (MV) of the SbTMVP-MMVD candidate meets one or more criteria, inserting the SbTMVP-MMVD candidate into a candidate list for the current block; (v) in accordance with a determination that the MV of the SbTMVP-MMVD candidate does not meet the one or more criteria, forgoing inserting the SbTMVP-MMVD candidate into the candidate list for the current block; and (vi) reconstructing the current block using the candidate list.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 5A is a flow diagram illustrating an example method of encoding video in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
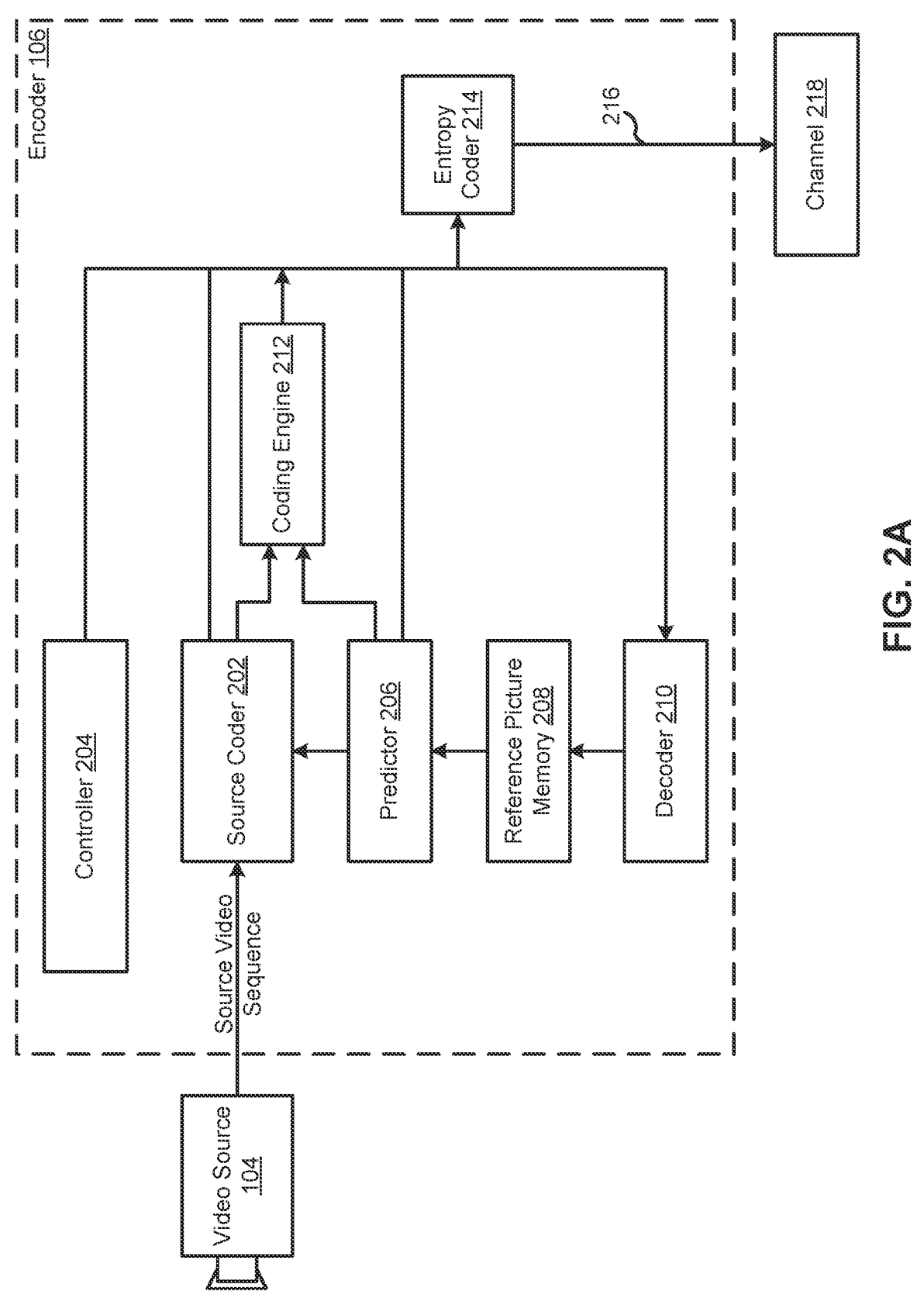
FIG. 2A is a block diagram illustrating example elements of an encoder component in accordance with some embodiments.

The present disclosure describes, among other things, systems and methods of applying a merge motion vector difference (MMVD) to a subblock-based motion vector prediction (SbTMVP) candidate (in subblock MMVD merge list). An example maximum candidate list size is 16. For example, the syntax element, MMVD index, may be signaled to indicate the MMVD offset for the SbTMVP merge candidate, and the MMVD offset may be used to derive the offset value of the displacement vector (DV) for each SbTMVP-MMVD candidate. The final DV for each SbTMVP-MMVD candidate may be calculated from the DV of SbTMVP merge candidate with the selected offset. Different subblock-based motion field may be obtained using the different DV offset at different MMVD offset positions.

However, if there is no MV checking mechanism, an SbTMVP-MMVD candidate with MV fields that are identical (or nearly identical) to other candidates may be put into the candidate list. In some embodiments, a checking mechanism is used to detect duplicated MV or MV diversity of the SbTMVP-MMVD during the candidate list construction. Removing redundancy can improve coding efficiency. For example, excluding a redundant candidate allows for another candidate to be added to the list, which improves list diversity and may give better candidates for coding (thereby improving accuracy/precision of the video coding).

Another issue is that the displacement vector (DV) of the SbTMVP-MMVD candidate may have a position that is outside of a boundary condition of an MV field buffer at the collocated position in the collocated picture. In some embodiments, the derivation of the DV for the SbTMVP merge candidate is adjusted during SbTMVP-MMVD candidate list construction. Adjusting the DV of the MMVD candidate to be within the boundary condition improves coding efficiency and/or hardware efficiency. For example, if the boundary condition is enforced in software then the coding hardware does not need to handle/enforce out of boundary values (e.g., allows for a smaller buffer size).

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream

108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color-space (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
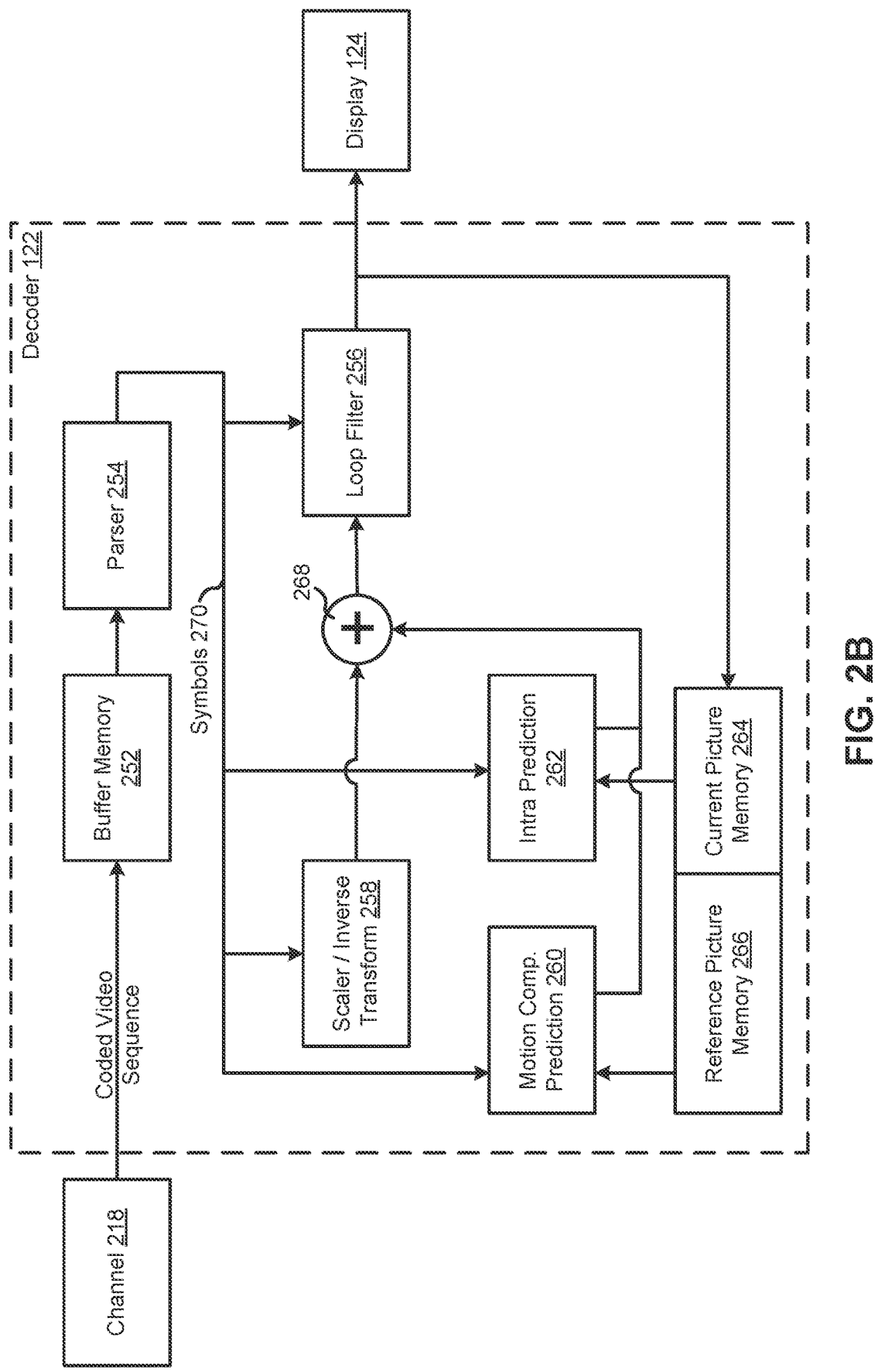
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as one or more integrated circuits and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
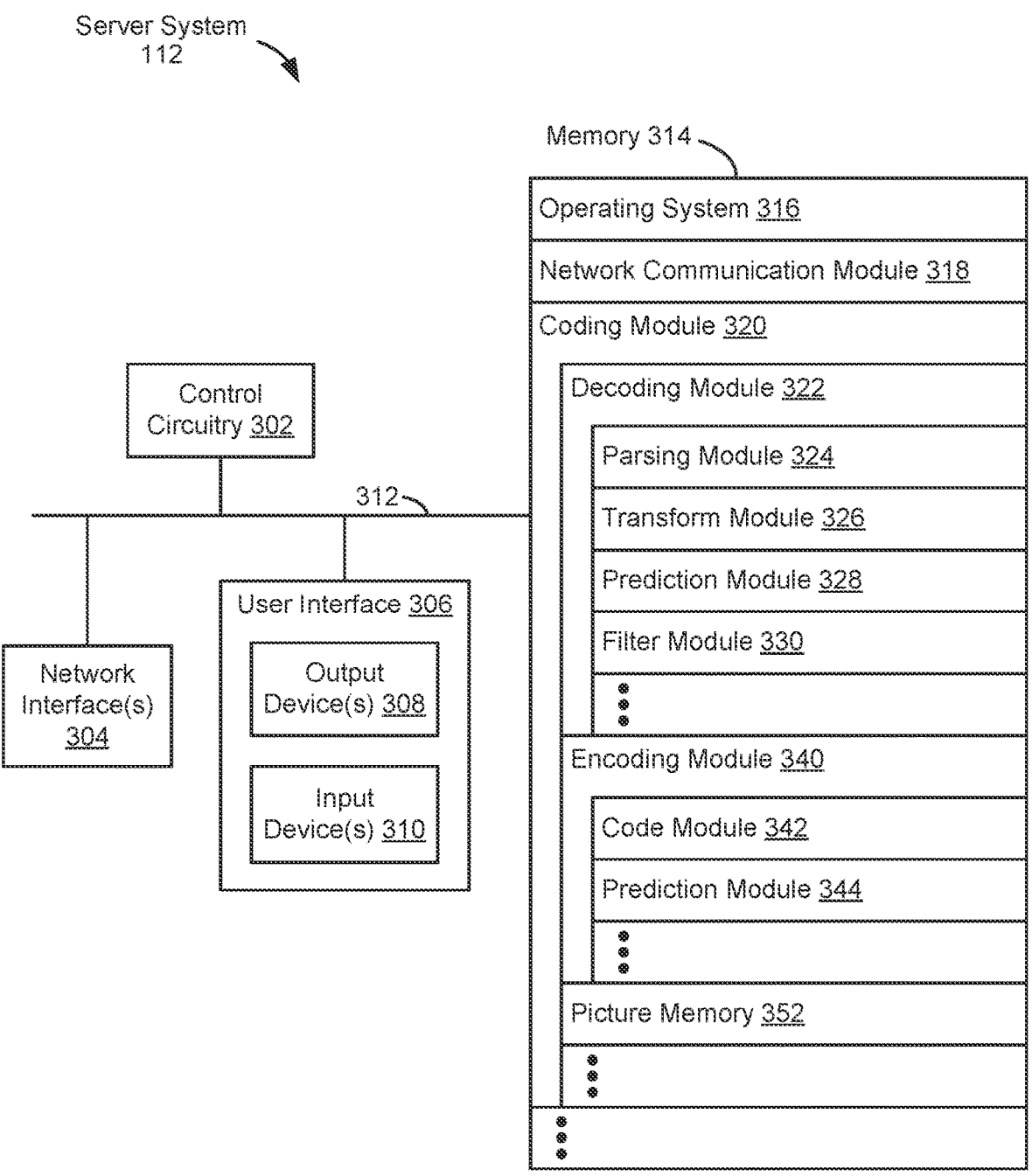
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;

a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Processes and Techniques

In order to improve the coding efficiency and reduce the transmission overhead of motion vector, the subblock level motion vector refinement may be applied to extend the CU-level temporal motion vector prediction (TMVP). Sub-block-based TMVP (SbTMVP) allows inheriting the motion information at subblock-level from the collocated reference picture. For example, each subblock of a large size CU may have its own motion information without explicitly transmitting the block partition structure or motion information. An SbTMVP may obtain motion information for each subblock in three steps, with the first step being the derivation of a displacement vector (DV) of the current CU. The second step may be to check the availability of the SbTMVP candidate and derive the central motion. The third step may be to derive the subblock motion information from the corresponding subblock by the DV. Unlike a TMVP candidate derivation that always derives the temporal motion vectors from the collocated block in the reference frame, SbTMVP may apply a DV that is derived from the MV of the left neighboring CU of the current CU to find the corresponding subblock in the collocated picture for each subblock of the current CU. In the case where the corresponding subblock is not inter-coded, the motion information of the current subblock may be set to be the central motion. The same collocated picture used for TMVP may be used for SbTMVP. SbTMVP may differ from TMVP in that: (1) TMVP predicts motion at a CU level while SbTMVP predicts motion at a sub-CU level, and (2) whereas TMVP fetches the temporal motion vectors from the collocated block in the collocated picture (e.g., the collocated block may be the bottom-right or center block relative to the current CU), SbTMVP may apply a motion shift before fetching the temporal motion information from the collocated picture. For example, the motion shift may be obtained from the motion vector from one of the spatial neighboring blocks of the current CU.

Figure 4:
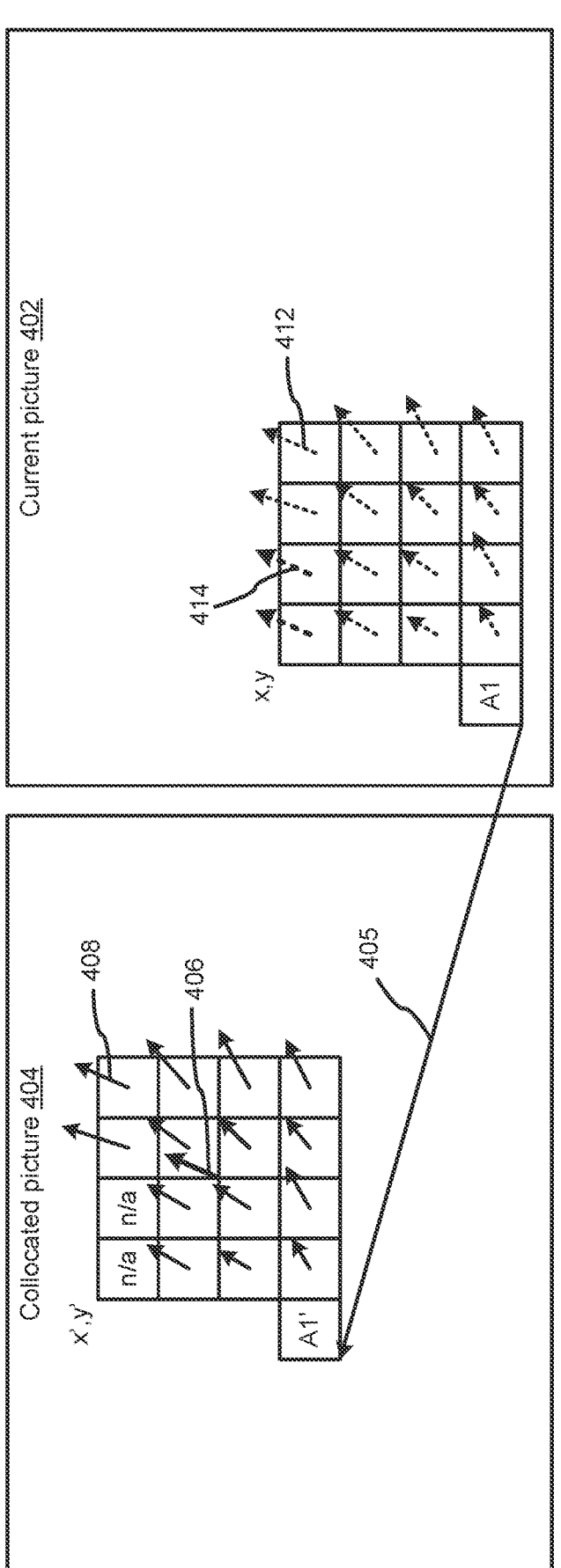
FIG. 4 is a diagram illustrating subblock-based motion prediction in accordance with some embodiments.

FIG. 4 is a diagram illustrating subblock-based motion prediction in accordance with some embodiments. FIG. 4 shows a current picture 402 with a current block A1. FIG. 4 further shows a collocated picture 404 having a corresponding block A1'. As illustrated by FIG. 4, a coding unit may be divided into subblocks, e.g., the subblock size may be fixed to 8×8 pixels. For example, as with affine merge mode, SbTMVP is applicable for coding units which are larger then 8×8 pixels. Subblock motion vectors may be derived in SbTMVP by applying a shift from a neighbor, and scaling subblock motion vectors. A motion shift may be derived on the collocated picture as indicated by line 405. For example, if the A1 neighbor has a motion vector that uses the collocated picture as its reference picture, then the motion vector is used. Otherwise, the motion shift may be set to zero (e.g., a 0,0 shift). The derived motion shift may be applied in the collocated picture, e.g., (the shift is added to the current block's coordinates). Next, an initial vector 406 may be obtained from the center of CU (e.g., to be used as default for subblocks with unavailable motion information). In some embodiments, when the motion of the center subblock of the CU is also unavailable, a motion vector predictor (MVP) with a signaled motion vector difference (MVD) is used instead. Then, subblock motion information 408 (e.g., from the center of subblocks) is obtained. Subblock motion vectors 412 (and motion vectors 414 corresponding to the initial vector 406) and/or reference indices may be derived for the current picture 402 by applying scaling for corresponding subblocks of the collocated picture 404. For example, when an SbTMVP mode is enabled, a list of merge candidates may include an SbTMVP candidate as well as affine merge candidates.

An affine MMVD mode may be used to improve the coding gain by using subblock-based motion information with an affine parameter. Although, SbTMVP is one of the candidates in subblock-based merge list, MMVD is not supported for SbTMVP in current ECM design. The derived SbTMVP from the neighboring block may not be the optimal subblock-based motion field. In order to improve the SbTMVP, the SbTMVP with MMVD and/or advanced motion vector prediction (AMVP) mode may be used. For example, for a CU coded in SbTMVP mode with AMVP, the CU may be predicted similar to that of SbTMVP in merge mode except that the motion shift is signaled in the bitstream instead of being derived from neighboring blocks.

As an example, when a CU is coded in a modified SbTMVP mode, the CU may be split into n×n subblocks (e.g., 4×4 or 8×8), and the motion for each subblock may be derived from a corresponding subblock in a collocated picture (e.g., the collocated picture 404). The collocated picture (or other reference picture for the subblocks) may be selected in the same manner as with SbTMVP (e.g., the same collocated picture may be used for both). A corresponding subblock may be identified using a motion vector predictor (MVP) with a signaled motion vector difference (MVD). In some embodiments, a first flag is signaled to indicate whether a current block (e.g., a CU) is coded with SbTMVP. If the current block is coded with SbTMVP, a second flag is signaled to indicate whether an MVD is available. If the MVD is available, an MVD index may be signaled (so that a motion direction and/or magnitude can be obtained). As an example, the number of MVD may be equal to 16.

In some embodiments, MMVD is performed on an SbTMVP candidate in a subblock MMVD merge list. For example, the syntax element, MMVD index, is signaled to indicate the MMVD offset for the SbTMVP merge candidate, and this MMVD offset is used to derive the offset value of the displacement vector (DV) for each SbTMVP-MMVD candidate. The final DV' for each SbTMVP-MMVD candidate is calculated from the DV of the SbTMVP merge candidate with the selected offset. The subblock-based motion field to the offset DV' points is used as the SbTMVP-MMVD candidate. By using different DV offsets, different subblock-based motion field may be obtained to form a SbTMVP-MMVD candidate list. The step size in may be {4, 8, 12, 16, 20}, where the unit in the step size is an integer pixel unit. The number of directions of SbTMVP-MMVD may be 8, which is also used in affine MMVD. As with affine MMVD, the total number of the available SbTMVP-MMVD candidates may be less than or equal to 16. As an example, a spiral scanning order may be applied and up to 16 available candidates may be put into the candidate list. As another example, all MMVD candidates are scanned in spiral order and each may be put into the candidate list if it is an available candidate. A subblock-based template-matching (TM) may be applied for all available SbTMVP-MMVD candidates to reorder the SbTMVP-MMVD candidate list by using the TM cost in ascending order, (e.g., only the 16 SbTMVP-MMVD candidates with the smallest TM costs are signaled).

In some embodiments, a picture level flag of SbTMVP-MMVD mode is used (e.g., in a random access (RA)

configuration). This flag may be used to indicate whether the SbTMVP-MMVD is enabled (e.g., when both of the SPS flag of SbTMVP-MMVD and the SPS control flag in picture header for SbTMVP-MMVD are true). For example, the picture level enabling and disabling is determined based on the temporal ID and the SbTMVP-MMVD is only enabled at the highest two temporal layers for an RA case (e.g., to improve coding gain and runtime). In some embodiments, a flag is signaled (e.g., at a CU level) to indicated which collocated picture is to be used to derive subblock motion (e.g., the flag identifies one of two reference pictures). In some embodiments, the reference pictures for the subblocks are fixed to the reference picture corresponding to an index of 0.

There are several potential issues with using modified SbTMVP candidates. First, a modified SbTMVP candidate with duplicated MV fields may be put into the candidate list if there is no MV checking mechanism during candidate list construction. Second, the modified candidate position may exceed a boundary condition of the MV field buffer at the collocated position in the collocated picture. The techniques and approaches described below address these issues and others (e.g., improve the candidate list construction of SbTMVP-MMVD). The techniques/approaches may be implemented by processing circuitry (e.g., one or more processors or one or more integrated circuits). In one example, the one or more processors execute a program that is stored in a non-transitory computer-readable medium.

In some embodiments, a checking mechanism is used for duplicated MV or MV diversity of the SbTMVP-MMVD during the candidate list construction. For example, if the result shows that the MVs of the SbTMVP-MMVD are the duplicated MV or the MV diversity compared with the existing candidates in the candidate list, this SbTMVP-MMVD candidate is discarded. In cases in which the MV diversity is used, a difference between the MV component and a predefined threshold value is determined. When the different is smaller than (or equal to) the threshold value, the MV component is categorized as a similar MV component. For example, if both of the MV components, MVx and MVy, are similar MV components, the uni-prediction merge candidate is not put into the candidate list. For example, a subblock-based motion vector prediction (SbTMVP) for a subblock of a current block may be generated. Afterwards, an SbTMVP-MMVD candidate may be generated (e.g., by applying a merge motion vector difference (MMVD) to the SbTMVP). If a motion vector (MV) of the SbTMVP-MMVD candidate meets one or more criteria, then the SbTMVP-MMVD candidate may be included in a candidate list for the current block. If the MV of the SbTMVP-MMVD candidate does not meet the one or more criteria, the SbTMVP-MMVD candidate is not included in the candidate list for the current block.

FIG. 5A is a flow diagram illustrating a method 500 of encoding video in accordance with some embodiments. The method 500 may be performed at a computing system (e.g., the server system 112, the source device 102, or the electronic device 120) having control circuitry and memory storing instructions for execution by the control circuitry. In some embodiments, the method 500 is performed by executing instructions stored in the memory (e.g., the memory 314) of the computing system.

The system receives (502) video data comprising a plurality of blocks, including a current block (e.g., from a video source 104). The system generates (504) a subblock-based motion vector prediction (SbTMVP) candidate for a subblock of the current block. The system generates (508) a modified SbTMVP candidate. For example, the system generates an SbTMVP-MMVD candidate by applying a merge motion vector difference (MMVD) to the SbTMVP.

In accordance with a determination that a motion vector (MV) of the modified SbTMVP candidate meets one or more criteria, the system includes (510) the modified SbTMVP candidate in a candidate list for the current block. In some embodiments, the one or more criteria include a duplicated MV criterion. For example, a duplicated MV means that MV field information in the candidate is identical to the MV field information of the existing candidate in the candidate list. In some embodiments, the one or more criteria include an MV diversity criterion. For example, a predefined threshold value is used to determine whether the MV difference at each n×n subblock between the candidate and an existing candidate in the list is larger than (or equal to) this value. Here, a typical value of n is 4 or 8.

In accordance with a determination that the MV of the modified SbTMVP candidate does not meet the one or more criteria, the system forgoes (512) including the modified SbTMVP candidate into the candidate list for the current block. In some embodiments, the system encodes the current block using the candidate list.

In some embodiments, when the predefined threshold value is a scalar, if at least one component of the MV difference of the subblock is larger than (or equal to) the threshold value, this SbTMVP-MMVD candidate will be put into the candidate list. Otherwise, this SbTMVP-MMVD candidate will not be put into the candidate list.

In some embodiments, when the predefined threshold value is a scalar, if both components of the MV difference of the subblock are larger than (or equal to) the threshold value, this SbTMVP-MMVD candidate will be put into the candidate list. Otherwise, this SbTMVP-MMVD candidate will not be put into the candidate list.

In some embodiments, when the predefined threshold value is a vector of 2 components (horizontal and vertical that are set separately), if the correspondent components of the MV difference of the subblock are larger than (or equal to) the threshold value components, this SbTMVP-MMVD candidate will be put into the candidate list. Otherwise, this SbTMVP-MMVD candidate will not be put into the candidate list.

Figure 5B:
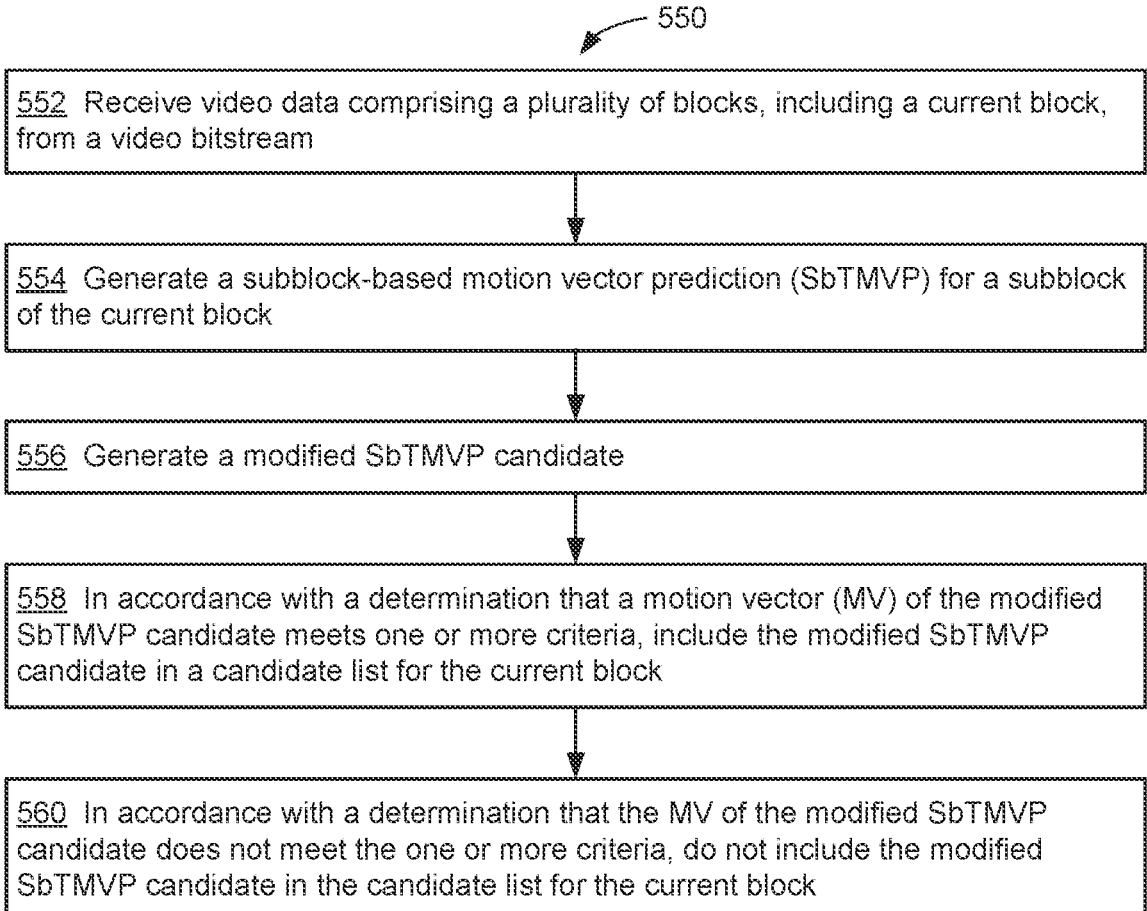
FIG. 5B is a flow diagram illustrating an example method of decoding video in accordance with some embodiments.

FIG. 5B is a flow diagram illustrating a method 550 of decoding video in accordance with some embodiments. The method 550 may be performed at a computing system (e.g., the server system 112, the source device 102, or the electronic device 120) having control circuitry and memory storing instructions for execution by the control circuitry. In some embodiments, the method 550 is performed by executing instructions stored in the memory (e.g., the memory 314) of the computing system.

The system receives (552) video data comprising a plurality of blocks, including a current block, from a video bitstream. The system generates (554) a subblock-based motion vector prediction (SbTMVP) for a subblock of the current block. The system generates (556) a modified SbTMVP candidate. For example, the system generates an SbTMVP-MMVD candidate by applying a merge motion vector difference (MMVD) to the SbTMVP. In some embodiments, an SbTMVP MMVD candidate list is generated with predefined MVD offsets. In some embodiments, the MMVD candidate list is derived from the SbTMVP in a subblock merge mode.

In accordance with a determination that a motion vector (MV) of the modified SbTMVP candidate meets one or more criteria, the system includes (558) the modified SbTMVP candidate in a candidate list for the current block.

In accordance with a determination that the MV of the modified SbTMVP candidate does not meet the one or more criteria, the system forgoes (560) including the modified SbTMVP candidate in the candidate list for the current block.

In some embodiments, the system reconstructs the current block using the candidate list. As described previously, the encoding process may mirror the decoding processes described herein. For brevity, those details are not repeated here.

Although FIGS. 5A and 5B illustrates a number of logical stages in particular orders, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

In some embodiments, the derivation of the displacement vector (DV) of SbTMVP merge candidate is adjusted for the SbTMVP-MMVD candidate list construction (e.g., regardless of whether the checking mechanism described above is applied). A DV offset (also sometimes referred to as an MVD offset) may be added to the displacement vector of the SbTMVP merge candidate (e.g., to obtain a final displacement vector to point to a corresponding subblock motion field in the collocated picture).

In some embodiments, the DV of the SbTMVP merge candidate is adjusted to ensure the MV field data of the MMVD candidate with the farthest MMVD offset does not exceed the boundary of MV field buffer at the collocated position in the collocated picture. For example, if the buffer size of the MV field at the collocated position in the collocated picture is M×N and maximum MMVD offset value is offset$_{max}$, for a w×h coded block, the DV=(x$_c$, y$_c$) should be adjusted to (x$_c$', y$_c$') in accordance with Equation 1 below.

Displacement Vector Adjustments $$\begin{cases} x_{c'} \le \dfrac{M}{2} - \dfrac{w}{2} - \text{offset}_{max}, & \text{if } x_c + \dfrac{w}{2} + \text{offset}_{max} > \dfrac{M}{2}; \text{otherwise}, x_{c'} = x_c \\ y_{c'} \le \dfrac{N}{2} - \dfrac{h}{2} - \text{offset}_{max}, & \text{if } y_c + \dfrac{h}{2} + \text{offset}_{max} > \dfrac{N}{2}; \text{otherwise}, y_{c'} = y_c \end{cases} \qquad \text{Equation 1}$$

In some embodiments, adjustment is applied to one component of DV. For example, this adjustment is applied for x$_c$ or y$_c$. In some embodiments, w×h coded block is replaced with a W×H CTU size so that all coded block sizes have the same adjustment equation as shown in Equation 2 below.

Displacement Vector Adjustments for CTU $$\begin{cases} x_{c'} \le \dfrac{M}{2} - \dfrac{W}{2} - \text{offset}_{max}, & \text{if } x_c + \dfrac{W}{2} + \text{offset}_{max} > \dfrac{M}{2}; \text{otherwise}, x_{c'} = x_c \\ y_{c'} \le \dfrac{N}{2} - \dfrac{H}{2} - \text{offset}_{max}, & \text{if } y_c + \dfrac{H}{2} + \text{offset}_{max} > \dfrac{N}{2}; \text{otherwise}, y_{c'} = y_c \end{cases}$$

Equation 2

In some embodiments, the constraint of the size of the collocated position is extended from one CTU row to three CTU rows. For example, this extension may be applied for SbTMVP-MMVD only, with no size extension for TMVP and SbTMVP.

(A1) In one aspect, some embodiments include a method (e.g., the method 500) of video encoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes: (i) receiving video data comprising a plurality of blocks, including a current block (e.g., from the video source 104); (ii) generating a subblock-based motion vector prediction (SbTMVP) candidate for a subblock of the current block; (iii) generating a SbTMVP-MMVD candidate by applying a merge motion vector difference (MMVD) to the SbTMVP; (iv) in accordance with a determination that a motion vector (MV) of the SbTMVP-MMVD candidate meets one or more criteria, inserting the SbTMVP-MMVD candidate into a candidate list for the current block; (v) in accordance with a determination that the MV of the SbTMVP-MMVD candidate does not meet the one or more criteria, forgoing inserting the SbTMVP-MMVD candidate into the candidate list for the current block; and (vi) encoding the current block using the candidate list.

(A2) In some embodiments of A1, the method further includes signaling the encoded current block via a video bitstream.

(A3) In some embodiments of A1 or A2, the method further includes signaling information about the candidate list in a video bitstream. For example, an index for the candidate list is signaled via the video bitstream.

(A4) In some embodiments of any of A1-A3, the one or more criteria comprise a criterion that the MV of the SbTMVP-MMVD candidate does not match an MV of another candidate in the candidate list.

(A5) In some embodiments of any of A1-A4, the one or more criteria comprise a criterion that the MV of the SbTMVP-MMVD candidate is at least a threshold difference from corresponding MVs of other candidates in the candidate list. In some embodiments, the threshold difference is a predefined threshold scalar value, and the criterion is that at least one component of the MV is more than the predefined threshold scalar value different from corresponding MVs of the other candidates in the candidate list. In some embodiments, the criterion is that each component of the MV is more than the predefined threshold scalar value different from corresponding MVs of the other candidates in the candidate list. In some embodiments, the threshold difference is a vector of components, and the criterion is that each component of the MV is more than a corresponding component of the vector of components different from corresponding MVs of the other candidates in the candidate list.

(A6) In some embodiments of any of A1-A5, the method further includes: (i) determining that a displacement vector (DV) of the SbTMVP-MMVD candidate exceeds a boundary of an MV field buffer; and (ii) in accordance with the determination that the DV of the SbTMVP-MMVD candidate exceeds the boundary of an MV field buffer, adjusting the DV of the SbTMVP-MMVD candidate so that a farthest MMVD offset does not exceed the boundary of the MV field buffer. In some embodiments, adjusting the DV of the SbTMVP-MMVD candidate comprises adjusting a horizontal component and a vertical component of the DV. In some embodiments, adjusting the DV of the SbTMVP-MMVD candidate comprising adjusting only one component of the DV.

(B1) In another aspect, some embodiments include a method (e.g., the method 550) of video decoding. In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254), a motion prediction component (e.g., the motion compensation prediction unit 260), and/or an intra prediction component (e.g., intra picture prediction unit 262). The method includes: (i) receiving video data (e.g., a coded video sequence) comprising a plurality of blocks, including a current block, from a video bitstream (e.g., the video bitstream of A1); (ii) generating a subblock-based motion vector prediction (SbTMVP) for a subblock of the current block; (iii) generating a SbTMVP-MMVD candidate by applying a merge motion vector difference (MMVD) to the SbTMVP; (iv) in accordance with a determination that a motion vector (MV) of the SbTMVP-MMVD candidate meets one or more criteria, inserting the SbTMVP-MMVD candidate into a candidate list for the current block; (v) in accordance with a determination that the MV of the SbTMVP-MMVD candidate does not meet the one or more criteria, forgoing inserting the SbTMVP-MMVD candidate into the candidate list for the current block; and (vi) reconstructing the current block using the candidate list. For example, a checking mechanism is used for duplicated MV or MV diversity of the SbTMVP-MMVD during the candidate list construction. If the result shows that the MVs of the SbTMVP-MMVD are the duplicated MV or the MV diversity compared with the existing candidates in the candidate list, this SbTMVP-MMVD candidate may be discarded. As an example, MV diversity is used to determine the relation between the difference of the MV component and a predefined threshold value. When the difference is smaller than (or equal to) the threshold value, the MV component is categorized as a similar MV component. If both of the MV components, MVx and MVy, are similar MV components, this uni-prediction merge candidate will not be put into the candidate list.

(B2) In some embodiments of B1, the one or more criteria comprise a criterion that the MV of the SbTMVP-MMVD candidate does not match an MV of another candidate in the candidate list. For example, duplicated MV means that MV field information in the candidate is identical to the MV field information of the existing candidate in the candidate list.

(B3) In some embodiments of B1 or B2, the one or more criteria comprise a criterion that the MV of the SbTMVP-MMVD candidate is at least a threshold difference from corresponding MVs of other candidates in the candidate list. For example, a predefined threshold value is used to determine whether the MV difference at each n×n subblock between the candidate and the existing candidate in the list is larger than (or equal to) this value or not. Example values of n include 4 and 8.

(B4) In some embodiments of B3: (i) the threshold difference is a predefined threshold scalar value; and (ii) the criterion is that at least one component of the MV is more than the predefined threshold scalar value different from corresponding MVs of the other candidates in the candidate list. For example, when the predefined threshold value is a scalar, if at least one component of the MV difference of the subblock is larger than (or equal to) the threshold value, this SbTMVP-MMVD candidate will be put into the candidate list. Otherwise, this SbTMVP-MMVD candidate will not be put into the candidate list.

(B5) In some embodiments of B3: (i) the threshold difference is a predefined threshold scalar value; and (ii) the criterion is that each component of the MV is more than the predefined threshold scalar value different from corresponding MVs of the other candidates in the candidate list. For example, when the predefined threshold value is a scalar, if both components of the MV difference of the subblock are larger than (or equal to) the threshold value, this SbTMVP-MMVD candidate will be put into the candidate list. Otherwise, this SbTMVP-MMVD candidate will not be put into the candidate list.

(B6) In some embodiments of B3: (i) the threshold difference is a vector of components; and (ii) the criterion is that each component of the MV is more than a corresponding component of the vector of components different from corresponding MVs of the other candidates in the candidate list. For example, when the predefined threshold value is a vector of 2 components (horizontal and vertical that are set separately), if the correspondent components of the MV difference of the subblock are larger than (or equal to) the threshold value components, this SbTMVP-MMVD candidate will be put into the candidate list. Otherwise, this SbTMVP-MMVD candidate will not be put into the candidate list.

(B7) In some embodiments of any of B1-B6, the method further includes: (i) determining that a displacement vector (DV) of the SbTMVP-MMVD candidate exceeds a boundary of an MV field buffer; and (ii) in accordance with the determination that the DV of the SbTMVP-MMVD candidate exceeds the boundary of an MV field buffer, adjusting the DV of the SbTMVP-MMVD candidate so that a farthest MMVD offset does not exceed the boundary of the MV field buffer. In some embodiments, in accordance with the determination that the DV of the SbTMVP-MMVD candidate does not exceed the boundary of an MV field buffer, forgo adjusting the DV of the SbTMVP-MMVD candidate. As an example, the derivation of the displacement vector (DV) of SbTMVP merge candidate is adjusted for SbTMVP-MMVD candidate list construction. In some embodiments, the displacement vector (DV) of SbTMVP merge candidate is adjusted so that the MV field data of the MMVD candidate with the farthest MMVD offset does not exceed the boundary of MV field buffer at the collocated position in the collocated picture.

(B8) In some embodiments of B7, adjusting the DV of the SbTMVP-MMVD candidate comprises adjusting a horizontal component and a vertical component of the DV. For example, if the buffer size of the MV field at the collocated position in the collocated picture is M×N and a maximum MMVD offset value is offsetmax, for a w×h coded block, then the DV=(xc, yc) is adjusted to (xc', yc') using Equation 1 above.

(B9) In some embodiments of B7, adjusting the DV of the SbTMVP-MMVD candidate comprising adjusting only one component of the DV. For example, the adjustment is applied to one component of DV (e.g., is applied for xc or yc). In some embodiments, the w×h coded block is replaced by a W×H CTU size so that all different coded block size has the same adjustment equation as shown in Equation 2.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A6 and B1-B9 above). In yet another aspect, some embodiments include a non-transitory computer-readable storage medium storing one or more sets of instructions for execution by control circuitry of a computing system, the one or more sets of instructions including instructions for performing any of the methods described herein (e.g., A1-A6 and B1-B9 above).

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving video data comprising a plurality of blocks, including a current block, from a video bitstream;
   obtaining a subblock-based motion vector prediction (SbTMVP) candidate for a subblock of the current block;
   identifying a merge motion vector difference (MMVD) based on a signaled indicator in the video bitstream;
   generating a displacement vector (DV) for an SbTMVP-MMVD candidate by applying the MMVD to the SbTMVP candidate;
   when a motion vector (MV) of the SbTMVP-MMVD candidate meets one or more criteria, including the SbTMVP-MMVD candidate into a candidate list for the current block;
   when the MV of the SbTMVP-MMVD candidate does not meet the one or more criteria, generating an adjusted SbTMVP candidate by applying an adjustment to the DV of the SbTMVP-MMVD candidate so that the MV does not exceed a boundary of an MV field buffer and including the adjusted SbTMVP candidate into the candidate list for the current block; and
   reconstructing the current block using the candidate list.

2. The method of claim 1, wherein the one or more criteria comprise a criterion that the MV of the SbTMVP-MMVD candidate does not match an MV of another candidate in the candidate list.

3. The method of claim 1, wherein the one or more criteria comprise a criterion that the MV of the SbTMVP-MMVD candidate is at least a threshold difference from corresponding MVs of other candidates in the candidate list.

4. The method of claim 3, wherein:
   the threshold difference is a predefined threshold scalar value; and
   the criterion is that at least one component of the MV is more than the predefined threshold scalar value different from corresponding MVs of the other candidates in the candidate list.

5. The method of claim 3, wherein:
   the threshold difference is a predefined threshold scalar value; and
   the criterion is that each component of the MV is more than the predefined threshold scalar value different from corresponding MVs of the other candidates in the candidate list.

6. The method of claim 3, wherein:
   the threshold difference is a vector of components; and
   the criterion is that each component of the MV is more than a corresponding component of the vector of components different from corresponding MVs of the other candidates in the candidate list.

7. The method of claim 1, wherein the one or more criteria comprise a criterion that a farthest MMVD offset does not exceed the boundary of the MV field buffer.

8. The method of claim 7, wherein adjusting the DV of the SbTMVP-MMVD candidate comprises adjusting a horizontal component and a vertical component of the DV.

9. The method of claim 7, wherein adjusting the DV of the SbTMVP-MMVD candidate comprising adjusting only one component of the DV.

10. A computing system, comprising:
   control circuitry;
   memory; and
   one or more sets of instructions stored in the memory and configured for execution by the control circuitry, the one or more sets of instructions comprising instructions for:
      receiving video data comprising a plurality of blocks, including a current block;
      generating a subblock-based motion vector prediction (SbTMVP) for a subblock of the current block;
      identifying a merge motion vector difference (MMVD) for the subblock of the current block;
      generating a displacement vector (DV) for a modified SbTMVP candidate by applying the MMVD to the SbTMVP;
      when a motion vector (MV) of the modified SbTMVP candidate meets one or more criteria, including the modified SbTMVP candidate in a candidate list for the current block;
      when the MV of the modified SbTMVP candidate does not meet the one or more criteria, generating an adjusted SbTMVP candidate by applying an adjustment to the DV of the modified SbTMVP candidate so that the MV does not exceed a boundary of an MV field buffer and including the adjusted SbTMVP candidate in the candidate list for the current block; and
      encoding the current block using the candidate list.

11. The computing system of claim 10, wherein the one or more criteria comprise a criterion that the MV of the modified SbTMVP candidate does not match an MV of another candidate in the candidate list.

12. The computing system of claim 10, wherein the one or more criteria comprise a criterion that the MV of the modified SbTMVP candidate is at least a threshold difference from corresponding MVs of other candidates in the candidate list.

13. The computing system of claim 12, wherein:
   the threshold difference is a predefined threshold scalar value; and
   the criterion is that at least one component of the MV is more than the predefined threshold scalar value different from corresponding MVs of the other candidates in the candidate list.

14. The computing system of claim 12, wherein:
   the threshold difference is a predefined threshold scalar value; and
   the criterion is that each component of the MV is more than the predefined threshold scalar value different from corresponding MVs of the other candidates in the candidate list.

15. The computing system of claim 12, wherein:
   the threshold difference is a vector of components; and
   the criterion is that each component of the MV is more than a corresponding component of the vector of components different from corresponding MVs of the other candidates in the candidate list.

16. The computing system of claim 10, wherein the one or more criteria comprise a criterion that a farthest MMVD offset does not exceed the boundary of the MV field buffer.

17. The computing system of claim 16, wherein adjusting the DV of the modified SbTMVP candidate comprises adjusting a horizontal component and a vertical component of the DV.

18. The computing system of claim 16, wherein adjusting the DV of the modified SbTMVP candidate comprising adjusting only one component of the DV.

19. A non-transitory computer-readable storage medium storing a video bitstream that is generated by a video encoding method, the video bitstream comprising:

coded information for a plurality of blocks of video data, the plurality of blocks including a current block; and an indicator indicating a merge motion vector difference (MMVD) for a subblock of the current block;

wherein the video encoding method comprises:

generating a subblock-based motion vector prediction (SbTMVP) for the subblock of the current block;

identifying the MMVD for the subblock of the current block;

generating a displacement vector (DV) for a modified SbTMVP candidate by applying the MMVD to the SbTMVP;

when a motion vector (MV) of the modified SbTMVP candidate meets one or more criteria, including the modified SbTMVP candidate in a candidate list for the current block;

when the MV of the modified SbTMVP candidate does not meet the one or more criteria, generating an adjusted SbTMVP candidate by applying an adjustment to the DV of the modified SbTMVP candidate so that the MV does not exceed a boundary of an MV field buffer and including the adjusted SbTMVP candidate in the candidate list for the current block; and encoding the current block using the candidate list.

\* \* \* \* \*